No. 666,047.
G. N. ENNERS.
ALARM FOR REFRIGERATING PANS.
(Application filed Apr. 10, 1900.)
Patented Jan. 15, 1901.
(No Model.)
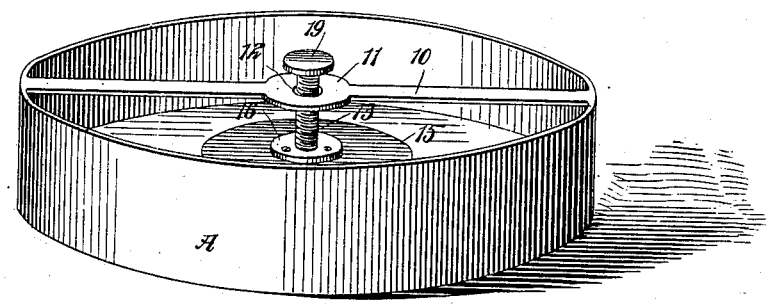
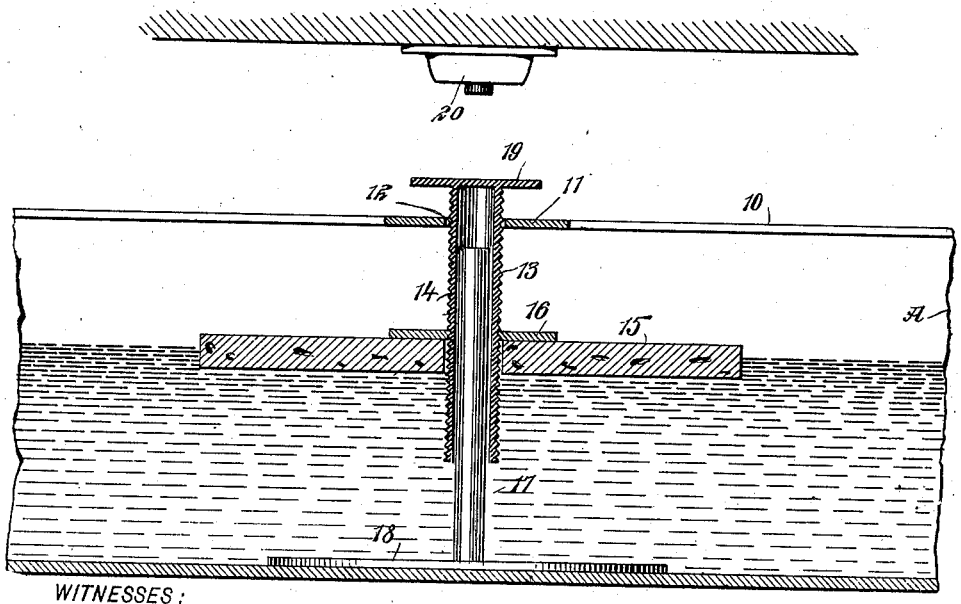
WITNESSES:
INVENTOR
George N. Enners.
BY
ATTORNEYS

UNITED STATES PATENT OFFICE.

GEORGE N. ENNERS, OF NEW YORK, N. Y.

ALARM FOR REFRIGERATING-PANS.

SPECIFICATION forming part of Letters Patent No. 666,047, dated January 15, 1901.

Application filed April 10, 1900. Serial No. 12,324. (No model.)

*To all whom it may concern:*

Be it known that I, GEORGE N. ENNERS, a citizen of the United States, and a resident of the city of New York, borough of Brooklyn, in the county of Kings and State of New York, have invented a new and Improved Alarm for Refrigerator-Pans, of which the following is a full, clear, and exact description.

The purpose of this invention is to provide a simple form of an alarm device especially adapted for application to the drip-pans of refrigerators and to so construct the device that when the water in the pan reaches a certain level the device will be automatically brought in contact with the trip and actuating mechanism of any suitable alarm.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of a refrigerator-pan having the improvement applied thereto, and Fig. 2 is an enlarged view illustrating a partial vertical section through the refrigerator-pan and an alarm with which the float is adapted to engage.

A represents a refrigerator-pan of any approved construction. In the drawings this pan is represented as round, although it may be given any desired shape, and a cross-bar 10 is provided for the said pan, extending from side to side at the top, the cross-bar having an enlargement 11 at its center and an opening 12 in said enlargement. This cross-bar is adapted as a guide for a tube 13, which tube is provided with an exterior thread 14, and the said tube is adapted to extend beyond the cross-bar 10, as shown in Fig. 1; but the lower end of the tube is, preferably, at all times removed from the bottom of the pan. This tube 13 carries a float 15, which may be of cork or of other suitable material, and the float is adjustable on the tube 13, as the said float is provided at its top or at its bottom with a collar 16, having an interior thread corresponding to the thread on the tube 13, so that the float 15 may be adjusted up or down on the tube 13 in order to raise the said tube a given distance above the upper portion of the pan when the water in the pan reaches a certain height or attains a certain depth. The tube 13 is guided in its movement, which is vertical, through the medium of a pin 17, and this pin is secured in any suitable or approved manner to the bottom of the pan A. Preferably, however, the pin or post 17 is provided with a flange 18 at its bottom, and this flange is screwed, riveted, or otherwise attached to the bottom of the pan.

Thus it will be observed that the float can be adjusted on the tube 13 at any desired distance from the bottom of the pan, and when the water rises to a sufficient height to raise the float it will raise the tube 13, and this tube, which is ordinarily fitted with a cap 19 at its upper end, will be at that time carried up to such a height that the cap 19 will engage with a push-button 20 or its equivalent connected with an electric alarm or an alarm of any other description, and the alarm will thus be sounded as long as the button is pressed, which will be as long as the water continues to rise in the pan.

Having thus described my invention, I claim as new and desire to secure by Letters Patent—

1. In an alarm for refrigerator-pans, the combination with the pan, a guide carried by the upper portion of the pan, and a post secured to the bottom portion of the pan, of a tube mounted to slide loosely on said post, the outer end portion of the said tube passing through an opening in the guide attached to the pan, and a float mounted upon the said tube, as and for the purpose specified.

2. In an alarm for refrigerator-pans, the combination, with the pan, a guide carried by the upper portion of the pan, and a post secured to the bottom portion of the pan, of a tube mounted to slide loosely on the said post and provided with an exteriorly-threaded surface and a cap at its outer end, the outer end portion of the said tube passing through the opening in the guide attached to the pan, and a float adjustably mounted upon the threaded portion of the said tube, for the purpose described.

In testimony whereof I have signed my name to this specification in the presence of two subscribing witnesses.

GEORGE N. ENNERS.

Witnesses:
J. FRED. ACKER,
JNO. M. RITTER.